Sept. 24, 1968 F. R. BRADLEY 3,403,324

VOLTAGE DIVIDER NETWORKS

Filed Oct. 22, 1965

INVENTOR.
FRANK R. BRADLEY

BY Darby + Darby

ATTORNEYS

United States Patent Office 3,403,324

Patented Sept. 24, 1968

3,403,324

VOLTAGE DIVIDER NETWORKS

Frank R. Bradley, 9 Dash Place, Bronx, N.Y. 10463

Filed Oct. 22, 1965, Ser. No. 500,669

12 Claims. (Cl. 323—80)

ABSTRACT OF THE DISCLOSURE

A voltage divider network including a plurality of impedance elements such as resistors having at least one end selectively adapted for connection to a first or second terminal of the divider by a switching device, there being a separate lead wire from each switching device to the first and second terminals. The impedance of each lead wire of the pair of lead wires associated with a given switch is preferably made equal to each other and, in one form of divider network, all of the impedance elements are also of the same value.

This invention relates to voltage divider networks and more particularly to voltage divider networks having circuit wiring configurations for increasing their accuracy.

As is known, a voltage divider network is a device for producing a predetermined voltage across its output terminals from a voltage source connected to its input terminals by division of the network voltage and current through one or more impedance elements. In variable voltage dividers used for electrical measurements and other purposes, a plurality of impedances are provided and they are interconnected in the network by one or more switching devices. The switches are actuated in a controlled manner to produce a predetermined voltage division ratio.

The present invention is directed to improved variable voltage divider networks and more particularly to a divider network circuit configuration for reducing the interaction between certain impedance elements of the network to thereby increase network accuracy. In accordance with the invention a voltage divider of the so-called conductance type is provided with dualized wiring for one or more of its switches so that each impedance element operating with a respective switch operates substantially independently of the other impedance elements of the network. By doing this, the current through each impedance element, including its leads, is kept separate from and made independent of the currents in other impedance elements and their associated leads. Therefore, each lead resistance is uniquely associated with one and only one impedance element. It may be considered as part of the element, and there is no interaction via common lead resistance.

It is therefore an object of the present invention to provide improved voltage divider networks in which one or more impedance elements operate on independent wiring circuits.

Another object is to provide a voltage divider network having dualized wiring between an impedance element and a switch for connecting the element into the network in a predetermined manner.

An additional object is to provide a voltage divider of the so-called conductance type in which a separate wire is used to connect an impedance element to each contact of the switch used to place the element in one or the other of the arms of the divider.

Another object is to provide a voltage divider network in which the impedance elements are formed of similar resistance elements made at the same time to increase the tracking accuracy of the divider.

Figure 1:
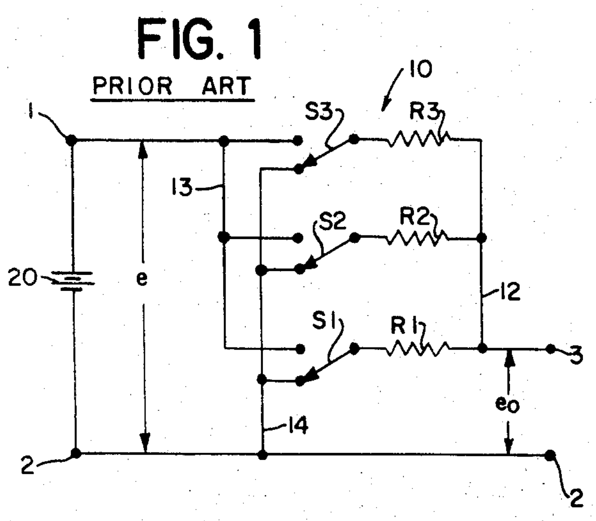
FIG. 1 PRIOR ART
Figure 2:
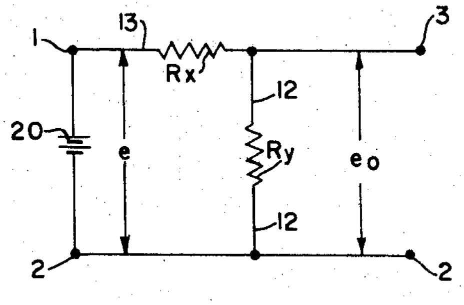
Figure 3:
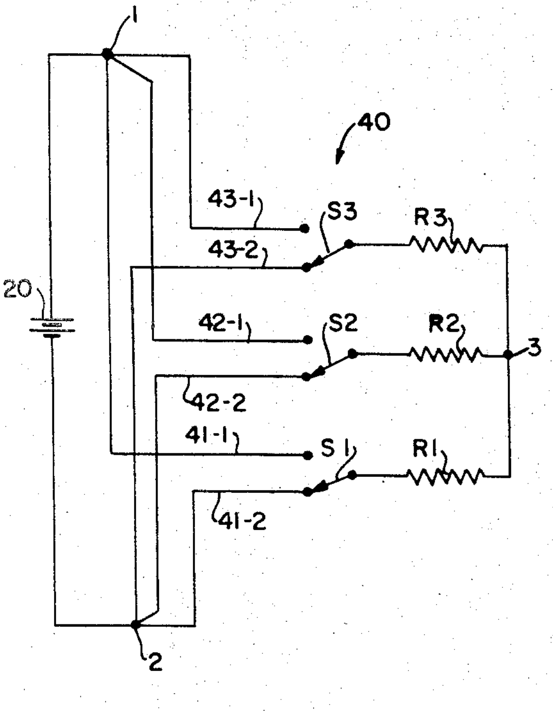
Figure 4:
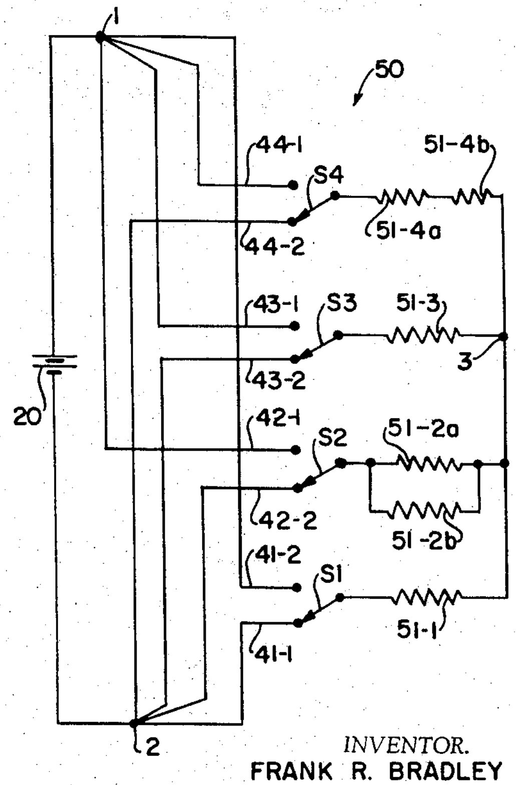

Other objects and advantages of the present invention will become more apparent upon reference to the following specification and annexed drawings in which:

FIG. 1 is a schematic wiring diagram of a prior art type of voltage divider of the so-called conductance type; FIG. 2 is a schematic diagram illustrating the operating principles of voltage dividers of the type of FIG. 1; FIG. 3 is a schematic diagram of an improved voltage divider incorporating the principles of the present invention; and FIG. 4 is a schematic diagram of a divider incorporating another technique for improving divider accuracy.

FIG. 1 illustrates a general type of prior art voltage divider network 10 of the so-called conductance type whose operation and accuracy the present invention improves. Here, the divider 10 is a three terminal network having an input terminal 1, a common input-output terminal 2, and an output terminal 3. A source of voltage, such as a battery 20, producing a voltage $e$ is connected across input terminals 1 and 2 and the output voltage $e_o$ is taken off across terminals 2 and 3.

Divider 10 illustratively has three resistors $R_1$, $R_2$ and $R_3$ each of which has one end connected to ouput terminal 3 by a common line 12. The other end of each resistor is connected to the movable arm of a respective single-pole double-throw switch $S_1$, $S_2$ and $S_3$ which connects the respective resistor either to terminal 1 or 2 depending upon the switch position. The upper stationary contacts of all the switches S are connected by a common line 13 to terminel 1 while the lower stationary contacts are connected by a common line 14 to terminal 2. It should be understood that as many resistors R and their respectively connected switches S as desired can be used.

The general principles of operation of the conductance type divider network of FIG. 1 are explained by referring to FIG. 2. Here, $R_x$ represents all of those resistors connected in parallel across terminals 1 and 3 (the respective switch S for a resistor R in the "up" position) while $R_y$ represents all of those resistors connected in parallel across terminals 2 and 3 (the respective switch S for a resistor R in the "down" position). Resistors $R_x$ and $R_y$ each represent any given number of resistors from zero to the maximum number of resistors available in the network, connected in parallel in each of the $R_x$ and $R_y$ branches of the network.

The output voltage $e_0$ is given in FIG. 2 by:

(1)
$$e_0=\frac{eR_y}{R_x+R_y}=\frac{eR_y+R_x}{R_x+R_y}\frac{1}{R_x}$$

The factor $$\frac{R_yR_x}{R_x+R_y}$$

in (1) is the value of $R_x$ and $R_y$ in parallel which is the value of all of the resistances of the network in parallel. This is produced when input terminals 1 and 2 are shorted together. Since this value is a constant, it is designated as $R_0$.

The factor $1/R_x$ in (1) can also be represented as:

(2)
$$\frac{1}{R_x}=\left(\frac{1}{AR}+\frac{1}{BR}+\dots+\frac{1}{DR}+\dots\frac{1}{NR}\right)$$

where R is a resistance value and A, B, . . . D . . . N are integers. Equation 2 gives the reciprocals of the parallel resistances placed into the $R_x$ arm of the network. Equation 1 now becomes in terms of $e_0$:

(3)
$$e_o=eR_o\frac{1}{R_x}=e\left[\frac{R_o}{R}\left(\frac{1}{A}+\frac{1}{B}+\dots\frac{1}{D}+\dots\frac{1}{N}\right)\right]$$

Since for any given network of FIGS. 1 or 2 $R_o$ is known and R is a constant, values of A, B, C, D, . . . N can be selected to produce a desired output voltage function $e_0$ in response to an input voltage $e$ as the various resistors R are switched between terminals 1 and 2. Typical networks produce decimal division, binary division, etc.

As should be evident from consideration of FIGS. 1 and 2, voltage dividers of the type under consideration work upon a current division principle. For example, the voltage drop $e_0$ across $R_y$ is a function both of the resistance value of $R_y$ and the current through it. The latter is, of course, a function of the total value of $R_x$.

Since it is desired to make voltage dividers used for measurement purposes as accurate as possible, it is necessary to consider factors not normally taken into account in the design of dividers used for power supplies. Such factors include the resistance of the connecting leads, which can contribute to increase both $R_x$ and $R_y$ in the dividers under consideration, and the contact resistance of the switches S. The problem of the resistance of leads 13 and 14 in the divider 10 of FIG. 1 becomes particularly important since these leads are in common to some or all of the resistors R connected to either the positive or negative terminal of battery 20 depending upon the setting of the switches S. For example, in the case where all switches S are in the "up" position $$\left(\frac{1}{R_x}=\frac{1}{R_1}+\frac{1}{R_2}+\frac{1}{R_3}\right)$$

the left end of each resistor is connected to lead 13 and the total network current flows through lead 13. Lead 13 and its inherent resistance is therefore in series with $R_x$ and the current flow through lead 13 is proportional to the conductance of all three resistors $R_1$, $R_2$ and $R_3$. Therefore, the current through any resistor R and its voltage drop is dependent upon the resistances of the other resistors, including the contact resistance of the connected switch, as well as the common lead resistance.

It should be recognized in the circuit of FIG. 1 that as long as two or more resistors are connected to either of lines 13 or 14 by their respectively connected switches, that the current through any one of the resistors is influenced by the common resistance of a lead 13 or 14, the contact resistance of the respective switches and the values of each of the resistors. Such a result is undesirable in a network of this type since it gives rise to errors in the current division between the individual resistors of the network and therefore corresponding errors in the voltage division ratios to be achieved.

FIG. 3 shows an improved network 40 used in overcoming some of the disadvantages of the network of FIG. 1. Here, each resistor R has one end connected to the output terminal and the other to the center arm of a switch S as in FIG. 1. However, instead of using the common leads 13 and 14 between terminals 1 and 2, the wiring for each switch is dualized so that each stationary switch contact has a separate lead back to the common point which is taken as the high side of the divider. Thus, the upper ("up") stationary contact of each switch $S_1$, $S_2$ and $S_3$ is connected to terminal 1 by a separate and individual respective lead wire 41–1, 42–1 and 43–1. Similarly, the lower ("down") stationary contact is connected to terminal 2 by a separate and individual respective lead wire 41–2, 42–2 and 43–2. The "up" and "down" switch lead associated with each resistor is preferably made equal with each other in resistance.

When a switch S of the network of FIG. 3 is thrown to either the "up" or "down" position, the current in the respectively connected resistor R is now independent of any other resistor thrown to the same position. Also, each resistor is now separately and individually connected to either terminal 1 or 2 so that each resistor R has only the resistance of its own lead in series with it. For example, the effective resistance of $R_1$ is equal to the resistance of lead 41–1 or 41–2, depending on the setting of switch $S_1$, plus all series resistance between switch $S_1$ and terminal 3. The same is true of the other resistors $R_2$ and $R_3$. Thus, the current through any resistor R depends only upon the effective total resistance of that particular resistor and it is not influenced by any other resistor. Thus, when the lead resistance is equal, the total resistance of any section is equal when its switch is either "up" or "down."

The network 40 of FIG. 3 assures that current flow through any one lead 41, 42 or 43 is attributable only to the resistance with which that lead is in series. Since the resistance factors extraneous to the value of the resistor R connected in that lead is now segregated from the other resistors at all times, compensation can be provided for these factors, with the exception of the switch contact resistance. This, of course, improves the accuracy of the network.

While the dualized wiring arrangement of FIG. 3 is shown with a divider having only three resistive impedance elements, it should be understood that it can be used with a divider having any number of elements. Also, some or all of the impedance elements can be of the complex AC type. Further, the dualized wiring arrangement also can be used with several of the impedance elements of the divider, usually those of the most significant decades, while the others are connected in the manner of the prior art of FIG. 1.

FIG. 4 shows another type of divider 50 using the features of the present invention and an additional technique for improving the divider accuracy. Here, each of the resistors 51 is of the same value, called $r$, so that a binary coded decimal 1, 2, 4, 2 divider is formed. It should be considered that the series resistance connected to switch $S_1$ is $r$; to switch $S_2$ is $r/2$; to switch $S_3$ is $r$; and to switch $S_4$ is $2r$. Thus, from (2) it can be shown that the voltage division ratio from $S_4$ to $S_1$, is 1, 2, 4, 2. Each switch $S_1$ through $S_4$ has the dualized wiring connecting the stationary contacts to terminals 1 and 2.

The use of equal value resistors 51 for the divider increases its accuracy and stability, particularly when the resistors are selected from a group made on the same machinery, from the same batch of materials, by the same personnel at the same time. It is well known that such equal value resistors may be intercompared more accurately and track each other better, that is operate more nearly in the same manner in response to the same set of ambient conditions, than will resistors made separately. Only one "decade" of the divider is shown in FIG. 4 and the equal value resistor technique finds its greatest use in the most significant decade of the divider. However, it can be used in several or all of the decades of a divider. This equal value resistor technique also can be used without the lead dualization.

While preferred embodiments of the invention have been described above, it will be understood that these are illustrative only, and the invention is limited solely by the appended claims.

What is claimed is:

1. In a voltage divider the combination comprising:
- first, second and third terminals,
- means adapted for connecting a source of voltage to said first and second terminals,
- an impedance means,
- means for connecting one end of said impedance means to said third terminal,
- switching means for selectively connecting the other end of the impedance means to said first or second terminal,
- and a separate lead wire connected between said switching means and each of said first and second terminals.

2. A voltage divider as in claim 1 wherein said impedance means is a resistor.

3. A voltage divider as in claim 2 wherein said switching means has two contacts and the separate lead wires connect each of said contacts to a respective one of said terminals.

4. In a voltage divider the combination comprising:
- first, second and third terminals, means adapted for connecting a source of voltage to said first and second terminals, a plurality of impedance means, means for connecting one end of each of said impedance means to said third terminal, a separate switching means for each of said impedance means for selectively connecting the other end of the respective impedance means to said first or second terminal, and a separate lead wire connected between each of said switching means and each of said first and second terminals.

5. A voltage divider as in claim 4 wherein each said switching means has two contacts and the separate lead wires connects each of said contacts to a respective one of said first and second terminals.

6. A voltage divider as in claim 4 wherein each of said impedance means is formed by one or more resistance elements and each of said resistance elements is of the same value.

7. In a voltage divider the combination comprising:

first, second and third terminals, means adapted for connecting a source of voltage to said first and second terminals, a plurality of resistance means at least one of which has a plurality of electrically connected resistance elements, each of said resistance elements of all of said resistance means being of the same value, means for connecting one end of each said resistance means to said third terminal, and a separate switching means for each said resistance means to selectively connect its other end to said first or second terminal.

8. A divider as in claim 1 wherein the resistance of each separate lead wire is substantially equal.

9. A divider as in claim 4 wherein the resistance of the respective wires of each pair of wires associated with a switching means is substantially equal to each other.

10. A divider as in claim 5 wherein the resistance of the respective wires of each pair of wires associated with a switching means is substantially equal to each other.

11. A voltage divider comprising a plurality of terminals, a pair of said terminals adapted to have a voltage applied thereto and a pair of said terminals adapted to have an output voltage taken thereacross, a plurality of impedance means, a respective switching means for each of said impedance means for selectively electrically connecting one end thereof to one of the terminals of a said pair of terminals, a separate electrical connecting means from each said switching means to each terminal of the terminal pair to which the electrical connection is to be made, and means for connecting the other end of each said impedance means to at least one of the terminals of the other terminal pair.

12. The voltage divider of claim 11 wherein the impedance of each said electrical connecting means associated with a given switching means is substantially equal.

References Cited

UNITED STATES PATENTS

| | | | |
|---|---|---|---|
| 2,423,463 | 7/1947 | Moore | 338—89 X |
| 2,738,504 | 3/1956 | Gray | 340—347 |
| 2,784,369 | 3/1957 | Fenemore et al. | 323—79 |
| 2,894,197 | 7/1959 | Berry | 323—79 |

MILTON O. HIRSHFIELD, *Primary Examiner.*

W. E. RAY, *Assistant Examiner.*